Patented Oct. 20, 1931

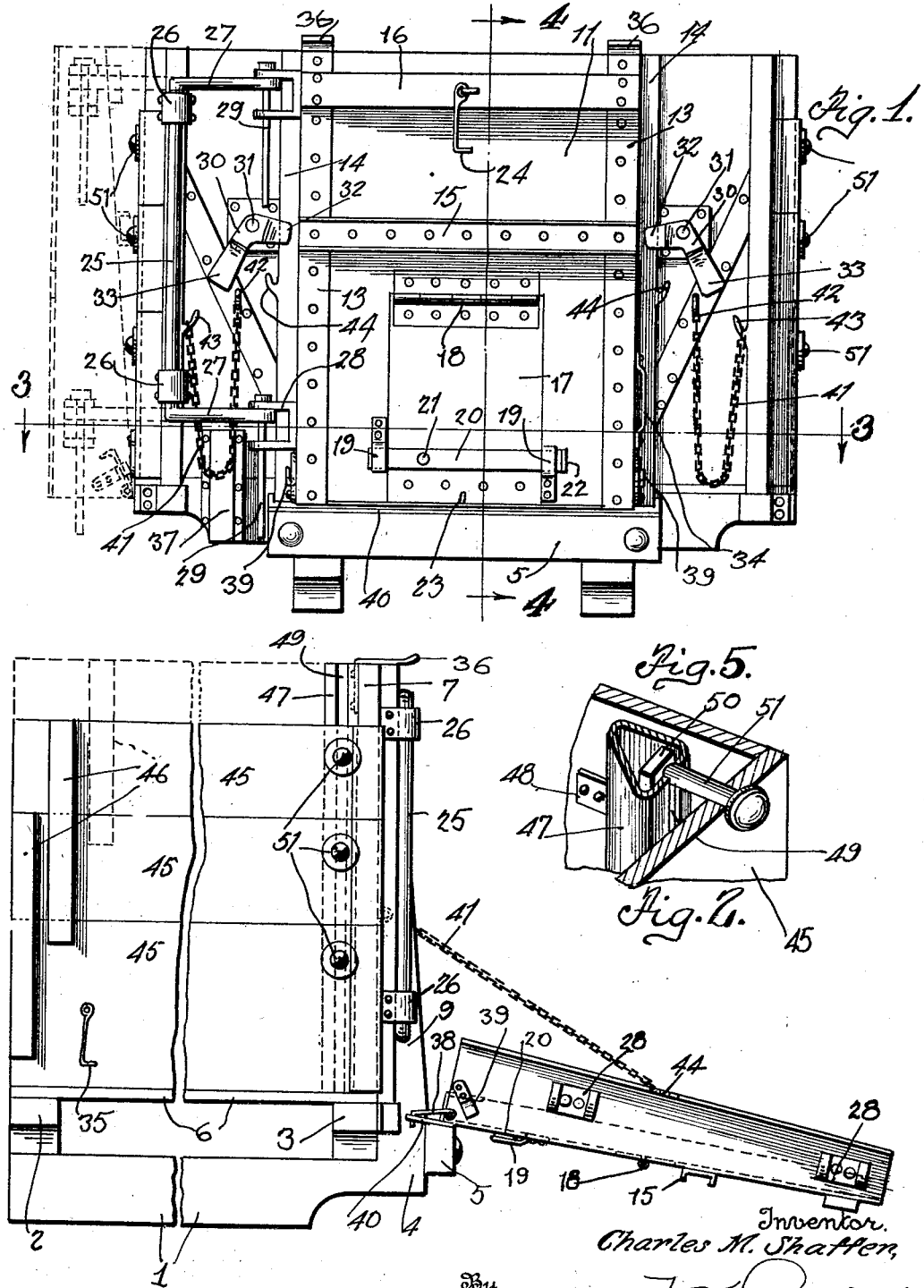

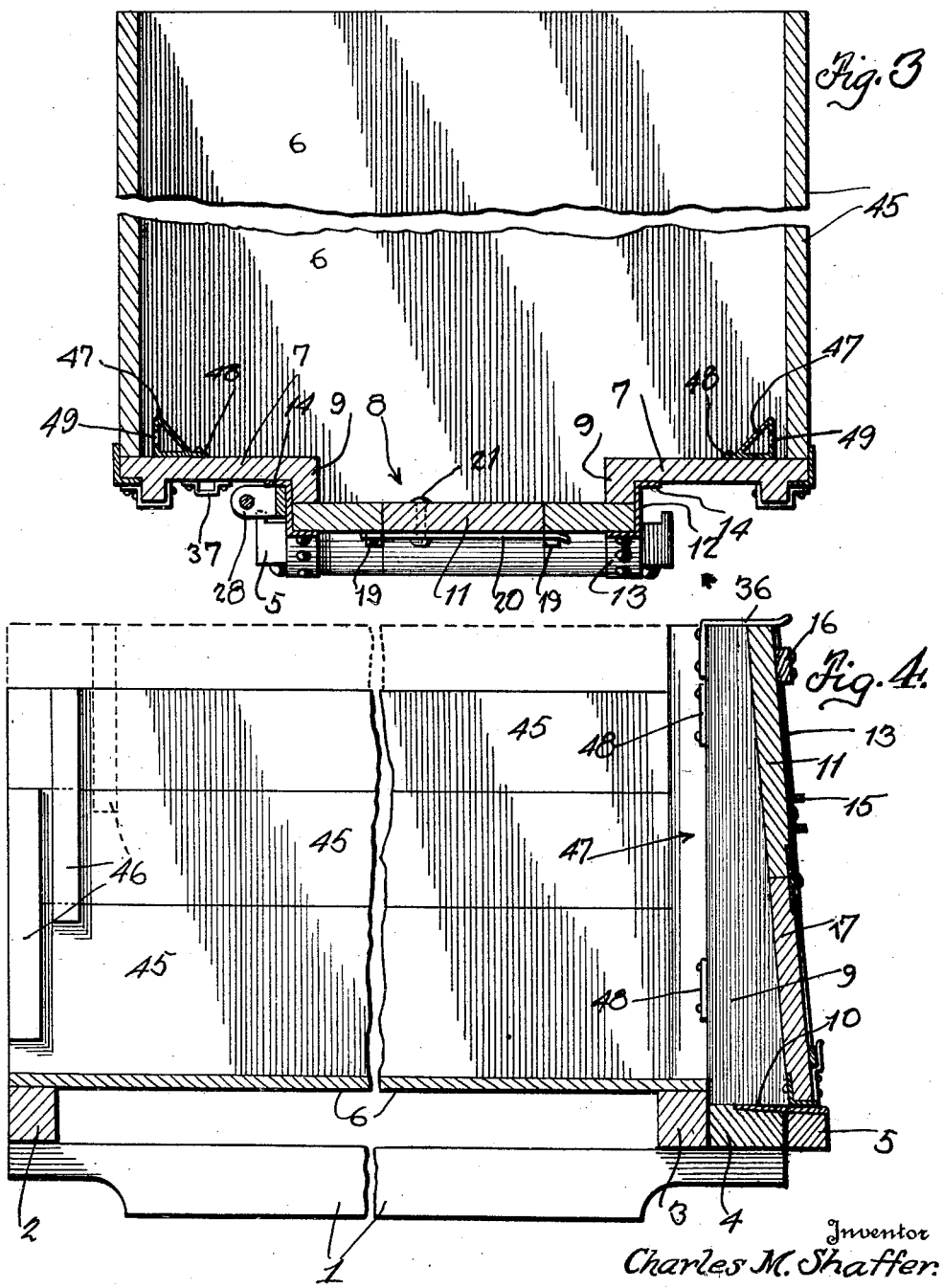

1,828,450

UNITED STATES PATENT OFFICE

CHARLES M. SHAFFER, OF DEEP RIVER, IOWA

END GATE FOR TRUCKS AND OTHER VEHICLES

Application filed November 21, 1929. Serial No. 408,825.

This invention relates to certain new and useful improvements in end gates for trucks and other vehicles.

The primary object of the invention is to provide an end gate for a truck or other vehicle wherein the hinge mounting for the end gate permits the latter to be horizontally swung to a position laterally of the truck and adjacent one side wall of the latter so that the truck or vehicle may be backed into close proximity to a freight car or other structure with possibility of damaging the end gate eliminated and to facilitate loading and unloading of the truck.

A further object of the invention is to provide an end gate for trucks and other vehicles in which the end gate includes a separable hinge connection with the end of the truck or the like to permit the end gate to be lowered from its upper end and attached at its lower end to the sill of the end gate opening or bumper bar of the truck and disposed at the desired angle for use as a chute, shovel board or loading runway for animals, devices being provided for supporting the end gate at the desired inclination.

A still further object of the invention is to provide in an end gate construction for trucks and other vehicles, removable side panels or boards for the truck having an interlocking connection with each other and also with the rear end wall of the truck outwardly of the gate construction.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a rear elevational view of a truck or other vehicle equipped with the improved end gate shown by full lines in closed position and by dotted lines in open position adjacent one side of the truck;

Figure 2 is a side elevational view, partly broken away showing the end gate lowered and supported by a chain for use as a discharge chute, shoveling board or runway;

Figure 3 is a horizontal sectional view taken on line 3—3 of Figure 1, showing the end gate in closed position and the channel guide to receive bolts carried by the removable side walls or boards of the truck;

Figure 4 is a vertical longitudinal sectional view taken on line 4—4 of Figure 1; and Figure 5 is a detail view showing the channel guide and bolt connection between the rear end wall of the truck and the removable side boards thereof.

Referring more in detail to the accompanying drawings, there is illustrated an end gate construction that may be associated with a truck or other vehicle and in the following description, the vehicle will be referred to as a truck. The truck embodies spaced longitudinally extending frame bars 1 supporting a forward cross-sill 2 and rear juxtaposed sills 3 and 4 with a centrally positioned bumper bar 5 contacting the sill 4. The truck body includes a bottom 6 supporting perpendicular rear end wall sections 7 adjacent opposite sides of the bottom 6 providing a central gate opening 8. An integral outwardly directed frame bar 9 is formed at each side of the gate opening 8 with the end wall sections 7 and extending downwardly below the bottom 6 of the truck rests upon the sill 4 and bumper bar 5 with a wear plate 10 interposed between the lower ends of the frame bars 9 and the sill 4, and bumper bar 5 as clearly shown in Figure 4, the outer edges of the gate opening frame bars 9 being inclined outwardly and downwardly.

A gate is associated with the end gate opening 8, the gate 11 being disposed at an inclination as shown in Figure 4, and engaged with the inclined outer sides of the frame bars 9 with its lower edge disposed above the bumper bar 5. An angle strip 12 is associated with each side edge of the door 11 with an outer angle flange 13 bolted or otherwise secured to the outer side of the gate 11 with the angle flange 14 at its inner edge moving into engagement with the outer face of the end wall sections 7 and inclosing the frame bars 9 as shown in Figure 3, the angle strip 12 being of gradually increasing width downwardly as illustrated. The gate 11 being preferably formed of boards or panels, the same is further braced by a transverse channel iron 15 intermediate the upper and lower ends and an upper cross bar 16.

A discharge door opening is provided in the lower end of the gate 11 and is closed by a door 17 hinged at its upper end as at 18 to the gate with a closure fastener at its lower end. The lower end of the gate 11 at each side of the door opening therein is provided with a pair of reversely positioned cleats 19 to be engaged by a cross bar 20 pivotally mounted as at 21 upon the door 17 adjacent one side thereof, the longer swinging end of the cross bar 20 being provided with a handle 22 to facilitate operation thereof. The cross bar 20 is retained by the cleats 19 with the door 17 retained in closed position. A socket 23 is formed in the lower edge of the door 17 to be engaged by the hook 24 carried by the upper cross-bar 16 upon the gate 11 for retaining the door 17 in open position when moved upon its hinged mounting 18.

The hinge mounting for the gate 11 comprises a vertical shaft 25 journaled in bearings 26 at the outer end of one of the end wall sections 7 as shown in Figure 1, with a relatively long hinge arm 27 at each end of the shaft 25 and extending at right angles therefrom. The companion hinge element for each hinge arm 27 includes a U-shaped strap 28 secured to the adjacent side of the gate 11 and directly to the angle strip 12, registering openings in adjacent ends of the hinge arms 27 and U-shaped hinge members 28 receiving relatively long rearwardly removable hinge pins 29. The end gate 11 is adapted to be swung outwardly of the rear end of the truck and to assume a position parallel with and adjacent one side of the truck as illustrated by dotted lines in Figure 1, the vertical shaft 25 of the hinge construction being rotated upon its axis and carrying therewith the hinge arms 27 to dispose them in an outward direction opposite to the position shown in Figure 1. At this time, the gate 11 is moved on its hinge pin connection 29 with the hinge arms 27 to be moved to the position adjacent the side of the truck. When the end gate is in closed position as shown in Figure 1, locking or retaining means therefor is associated with each inner edge flange 14 on the angle strips 12 and include a latch lever 30 pivotally mounted as at 31 upon each end wall section 7 and having upon one end a latch arm 32 to be moved to a position overlying the flange 14 by the opposite handle end 33. The end gate is securely retained in closed position by the latch lever 30. If desired, more than one latch lever may be associated with each side of the end gate and during their closing movement, tend to move the end gate inwardly into binding engagement with the frame bars 9 at each side of the gate opening 8. When the latch levers 30 are disengaged from the gate, the gate may be moved to an open position by the handle 34 adjacent the lower end of the swinging side edge thereof, and this handle 34 is intended for use as a keeper to be engaged by the hook 35 carried by a side wall of the truck for retaining the end gate in open position. It will therefore be seen that the end gate may be entirely laterally disposed relative to the truck to prevent damage thereto when the truck is backed into position adjacent a freight car, van or other structure, the rear bumper bar 5 being presented for abutting engagement with any object. The end gate is also guided in its closing movement by the angle straps 36 at the upper ends of the frame bars 9 as shown in Figure 4, that engage the upper end of the gate and cause the lower end of the gate to be moved into binding engagement with the wear plates 10 upon the sill 4 and bumper bar 5.

It is also intended to use the end gate 11 as a chute, shovel board or runway by removing the hinge pins 29 and detachably connecting the lower end of the gate to the wear plate 10 by means of the hooks 38 and to lower the end gate from the upper end to be supported at the desired inclination by chains or other connections between the sides of the gate and the rear end wall sections 7 of the truck. When the pins 29 are removed from the hinge arms 27 and hinge straps 28, they are placed in the receptacle 37 at the lower end of one of the wall sections 7 while hooks 38 carried by the lower ends of the angle strips 12 and normally retained in inoperative position by the keeper 39 and moved into engagement with end extensions 40 upon the wear plate 10 constituting a pivotal mounting for the lower end of the end gate. The latch levers are then disengaged from the angle flanges 14 and the end gate swung downwardly and supported at the desired inclination by the chains 41, one chain being disposed at each side of the gate and attached at one end to the outer side of the end wall section 7 as at 42 with its other end disengaged from the hooks 43 on the end wall section and engaged with the hooks 44 upon the angle strips 12. When the end gate is so lowered, the same is supported by the chains 41 with its lower edge resting upon the bumper bar 5, the lowered position of the end gate being illustrated in Figure 2. The gate is supported at different inclinations by engaging different lengths of the chains 41 with the hooks 44, that is by lengthening or shortening the effective portion of the chains.

The side wall construction of the truck is shown more clearly in Figures 2 to 5, the side wall including a plurality of side boards 45 removably and slidably mounted in position, one above the other, the side boards except the lower ones carrying a pair of depending guide bars 46, one on each side thereof to straddle the next adjacent lower side board, the guide bars 46 being carried by the side boards adjacent the ends thereof spaced from the rear end wall of the truck. The connection between the ends of the side boards and rear end of the truck includes a channel guide 47 secured to the inner face of each end wall section 7 adjacent its outer edge in any convenient manner, such as by the provision of laterally directed tongues or lugs 48 that are anchored to the end wall sections. The channel guide 47 is continuously slotted as at 49 in its outer side, the channel guide being open at its upper end to receive the head 50 of the bolt 51 that is secured to a side board 45. It will therefore be seen that by the provision of the guide bars 46 upon the side boards 45 and the bolt connection 51 between the other end of the side boards and the channel guides carried by the end wall sections of the truck, the side boards are securely retained in position and sections thereof may be removed when desired.

From the above detailed description of the invention, it is believed that the construction and operation thereof will at once be understood, and while there is herein shown and described the preferred embodiment of the present invention, it is nevertheless to be understood that minor changes may be made therein without departing from the spirit and scope of the invention as claimed.

I claim:—

1. In an end gate construction of the character described, an end wall having an opening therein and a closure gate for the opening hinged to the end wall and adapted to be moved to a position laterally and forwardly of the end wall, means on the end wall to engage opposite sides of the gate for holding the same in closed position, the hinge connection between the gate and end wall being separable to permit downward swinging movement of the gate on its lower edge, means for holding the gate engaged with the lower edge of the end wall, and means for holding the lowered gate at different inclinations for use as a chute, shovel board or runway.

2. In an end gate construction of the character described, an end wall having an opening therein and a closure gate for the opening hinged to the end wall and adapted to be moved to a position laterally and forwardly of the end wall, means on the end wall to engage opposite sides of the gate for holding the same in closed position, the hinge connection including a vertical shaft journalled at one side of the end wall, hinge arms extending at right angles therefrom, and hinge straps on the gate having removable pin connections with the outer ends of the hinge arms.

3. In an end gate construction of the character described, an end wall having an opening therein and a closure gate for the opening hinged to the end wall and adapted to be moved to a position laterally and forwardly of the end wall, means on the end wall to engage opposite sides of the gate for holding the same in closed position, the hinge connection between the gate and end wall being separable to permit downward swinging movement of the gate on its lower edge, means for holding the gate engaged with the lower edge of the end wall, means for holding the lowered gate at different inclinations for use as a chute, shovel board or runway, the hinge connection including a vertical shaft journalled at one side of the end wall, hinge arms extending at right angles therefrom, and hinge straps on the gate having removable pin connections with the outer ends of the hinge arms.

4. In an end gate construction of the character described, an end wall having an opening therein and a closure gate for the opening hinged to the end wall and adapted to be moved to a position laterally and forwardly of the end wall, a frame bar at each side of the gate opening extending outwardly of the end wall, angle strips carried by each side of the gate to inclose the frame bars when the gate is closed and to engage the outer side of the end wall, and closure fasteners on the end wall to engage the angle strips to hold the gate in closed position.

In testimony whereof I affix my signature.

CHARLES M. SHAFFER.